United States Patent
Gentric

(10) Patent No.: US 11,449,782 B2
(45) Date of Patent: Sep. 20, 2022

(54) DISTRIBUTED MACHINE LEARNING FOR CACHED DATA VALIDITY

(71) Applicant: Amadeus S.A.S., Biot (FR)

(72) Inventor: Philippe François Georges Gentric, La-Colle-sur-Loup (FR)

(73) Assignee: Amadeus S.A.S., Biot (FR)

( * ) Notice: Subject to any disclaimer, the term of this patent is extended or adjusted under 35 U.S.C. 154(b) by 258 days.

(21) Appl. No.: 16/934,653

(22) Filed: Jul. 21, 2020

(65) Prior Publication Data

US 2021/0034995 A1 Feb. 4, 2021

(30) Foreign Application Priority Data

Jul. 31, 2019 (FR) ...................................... 1908757

(51) Int. Cl.
*G06F 16/27* (2019.01)
*G06N 7/00* (2006.01)
(Continued)

(52) U.S. Cl.
CPC ............. *G06N 7/005* (2013.01); *G06F 16/27* (2019.01); *G06K 9/6262* (2013.01); *H04L 67/01* (2022.05); *H04L 67/568* (2022.05)

(58) Field of Classification Search
CPC ... G06N 7/005; G06F 16/27; G06F 16/24552; G06F 16/9032; G06K 9/6262; H04L 67/01; H04L 67/568
See application file for complete search history.

(56) References Cited

U.S. PATENT DOCUMENTS 6,725,333 B1 4/2004 Degenaro et al.
8,117,153 B2 2/2012 Cattell et al.
(Continued)

FOREIGN PATENT DOCUMENTS

EP 2908255 A1 8/2015
EP 3128441 A1 2/2017
WO 0176192 A2 10/2001

OTHER PUBLICATIONS

Bouhenguel, Redjem, "Adaptive energy-aware real-time detection models for cardiac atrial fibrillation", Florida Atlantic University, ProQuest Dissertations Publishing, 2012.
(Continued)

*Primary Examiner* — Vivek Srivastava
*Assistant Examiner* — Wuji Chen
(74) *Attorney, Agent, or Firm* — Thompson Hine LLP

(57) ABSTRACT

Database queries are processed by a first client storing cached data. The first client and a second client host a probabilistic model yielding validity values associating with the cached data indicating a probability that the cached data stored coincides with corresponding original data. The first client randomly selects queries at the time the respective query is received from one of the plurality of clients. For each of the queries randomly selected, a first piece of the cached data stored at the first client and matching the randomly selected query is retrieved, and a first piece of the original data matching the randomly selected query from the at least one original data source is retrieved. The probabilistic model is adapted using a machine learning algorithm based on the retrieved first piece of the cached data and the retrieved first piece of the original data and made available to the second client.

12 Claims, 7 Drawing Sheets

(51) Int. Cl.
G06K 9/62 (2022.01)
H04L 67/01 (2022.01)
H04L 67/568 (2022.01)

(56) References Cited

U.S. PATENT DOCUMENTS

| | | | |
|---|---|---|---|
| 2004/0249798 A1* | 12/2004 | Demarcken | G06F 16/24552 |
| 2006/0271557 A1 | 11/2006 | Harward et al. | |
| 2007/0288890 A1 | 12/2007 | Wells | |
| 2009/0234682 A1 | 9/2009 | Baggett et al. | |
| 2010/0106915 A1 | 4/2010 | Krishnaprasad et al. | |
| 2014/0052750 A1 | 2/2014 | Ciabrini et al. | |
| 2015/0032486 A1* | 1/2015 | Francois | G06Q 10/02 |
| | | | 705/5 |
| 2015/0264155 A1 | 9/2015 | Hrle et al. | |
| 2016/0021188 A1* | 1/2016 | Tapia | G06F 11/3006 |
| | | | 709/201 |
| 2016/0125029 A1 | 5/2016 | Damm | |
| 2016/0171008 A1 | 6/2016 | Ciabrini et al. | |
| 2016/0182678 A1 | 6/2016 | Wang | |
| 2019/0303449 A1* | 10/2019 | Canis | G06F 16/23 |
| 2019/0303480 A1* | 10/2019 | Canis | G06F 16/2379 |

OTHER PUBLICATIONS

Wikipedia, "Confusion matrix", Retrieved from the internet at https://en.wikipedia.org/wiki/Confusion_matrix, Nov. 26, 2017.
European Patent Office, Search Report and Written Opinion issued in Application No. 19166538.9 dated Jul. 10, 2019.
National Institute of Industrial Property, Preliminary Search Report issued in Application No. 1908757 dated Feb. 13, 2020.
Park, Chongsuh, Examiner, USPTO, Office Action issued in U.S. Appl. No. 15/944,657 dated Feb. 18, 2020.

* cited by examiner

DISTRIBUTED MACHINE LEARNING FOR CACHED DATA VALIDITY

BACKGROUND

The present invention relates to processing queries in a distributed database system. More specifically, it relates to improve the validity of cached data by way of machine learning.

Increasing data validity of data cached in distributed computing environments has already led to a number of approaches and solutions.

SUMMARY

According to a first aspect, a method of processing queries in a distributed database system is provided. The distributed database system comprises at least one original data source storing an amount of original data, and a plurality of clients comprising at least a first client and a second client. The first client and the second client store cached data which corresponds to at least a part of the amount of original data. The first client and the second client host a probabilistic model yielding validity values associated with the cached data indicating a probability that the cached data stored at the client coincides with the corresponding original data. The method comprises, at the first client, randomly selecting queries from among a plurality of queries handled by the distributed database system, at the time the respective query is received from one of the plurality of clients. For each of the queries randomly selected, a first piece of the cached data stored at the first client and matching the randomly selected query is retrieved, and a first piece of the original data matching the randomly selected query from the at least one original data source is retrieved. For queries not being randomly selected, a second piece of the cached data stored at the first client and matching the query is retrieved and the validity value of the second piece of the cached data stored at the first client is evaluated. If the validity value is below a given threshold, a second piece of the original data matching the query from the at least one original data source is retrieved, and the second piece of the cached data stored at the first client by the second piece of the original data is updated. The probabilistic model of the first client is adapted based on the retrieved first piece of the cached data and the retrieved first piece of the original data using a machine learning algorithm and made available to the second client.

In some embodiments, for queries randomly selected, an additional first piece of cached data stored by at least one client of the plurality of clients and matching the randomly selected query is retrieved.

In some embodiments, the probabilistic model is further adapted based on the additional first piece of cached data.

In some embodiments, the method further comprises, at the second client, receiving at least a part of the adapted probabilistic model of the first client from the first client and adapting the probabilistic model of the second client based on the retrieved adapted probabilistic model of the first client.

In some embodiments, making available the adapted probabilistic model to the second client comprises making available an updated validity value for the first cached data associated with a weight value to the second client, wherein the weight value indicates a level of correlation of the first piece of cached data stored at the first client with another piece of cached data stored at the second client, and wherein adapting the probabilistic model of the second client based on the retrieved adapted probabilistic model of the first client comprises adapting the probabilistic model of the second client based on the updated validity value for the first cached data associated and the associated weight value.

In some embodiments, the method further comprises, at the first client, retrieving at least a part of the adapted probabilistic model of the second client from the second client, wherein adapting the probabilistic model of the first client is further based on the retrieved adapted probabilistic model of the second client.

According to another aspect, a computing machine is provided, the computing machine acting as a first client for handling data in a distributed computing environment comprising a plurality of clients comprising at least a first client and a second client and at least one original data source storing an amount of original data, the computing machine being arranged to execute the method of any one of the aforementioned aspects.

According to still another aspect, a computer program is provided, the computer program product comprising program code instructions stored on a computer readable medium to execute the method steps according to any one of the aforementioned aspects, when said program is executed on a computer.

BRIEF DESCRIPTION OF THE DRAWINGS

The present mechanisms will be described with reference to accompanying figures. Similar reference numbers generally indicate identical or functionally similar elements.

DETAILED DESCRIPTION

Figure 1:
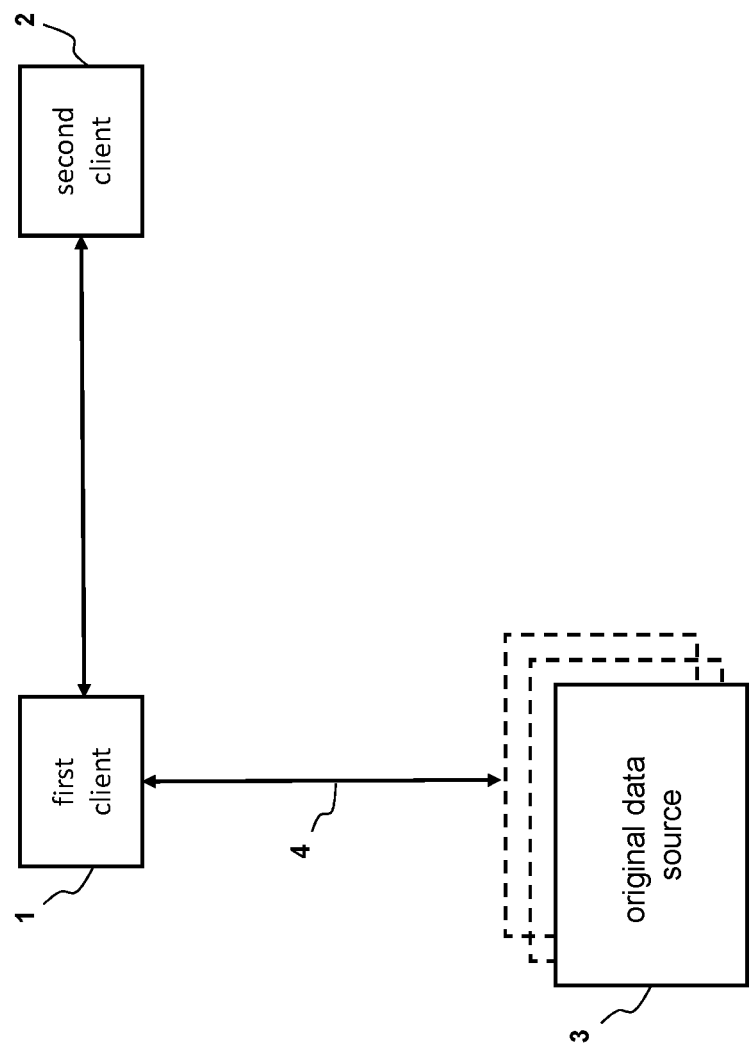
FIG. 1 is schematic depiction of a distributed computer environment as described herein.

The subject disclosure generally pertains to handling queries in a database system. The term "query" includes all types of database requests including e.g., read requests to retrieve data and write requests to insert, change or delete data.

A search platform may maintain pre-collected, pre-processed and/or pre-computed search results in a database, also referred to as cached data hereinafter. The search platform receives queries such as search queries, processes each of the search queries received from a client and performs corresponding searches within the pre-collected or pre-computed search results. The search platform may send a search request to perform a search for each search query to the database, also referred to as cache source hereinafter. The search request includes at least part of the one or more search criteria or parameters of the query. The cache source executes the search based on the search request, i.e., searches for data among the cached data matching with the search criteria or parameters of the search request and sends found cached data as pre-computed or pre-collected search results back to the search platform. The pre-computed or pre-collected search results (i.e., cached data) have parameter values matching the search criteria or parameters of the search request. Any matching pre-computed or pre-collected search result of the cache source may be returned by the search platform to the client from which the search query was received.

In case matching pre-computed or pre-collected search results are not found in the cache source, the search platform may make the search criteria of the search query less restrictive and may perform a revised search by sending revised search requests with the less restrictive search criteria to the cache source. The search platform may also perform the revised search by not applying all given search criteria, but only a subset of the search criteria. The particulars of which and how the search criteria of search queries are made less restrictive, and/or which search criteria or parameters are less important in search queries, may be set by given rules or determined using machine learning techniques, the latter resulting in e.g., probabilistic models based on historical search criteria and/or pre-computed or pre-collected search results.

Machine Learning as a branch of Artificial Intelligence possess the ability to flexibly track and assess changing environments. Hence, Machine Learning systems are, for example, employed to establish and maintain a probabilistic model to approximate the validity of cached data, in order to keep the cached data valid by employing computation resources efficiently. An example is given by U.S. Publication Number 2019/0303480, which is hereby incorporated by reference herein in its entirety. Various algorithms and techniques are applied for machine learning systems such as supervised, semi-supervised and unsupervised learning, reinforcement learning, feature learning, sparse dictionary learning, anomaly detection etc.

Machine learning systems often need to process large amounts of training data until their underlying model converges and can effectively be used in a productive system. Within some fields, such as telecommunications, public security, health insurance and retail, even "Big Data" in the range of Tera- and Zettabytes will be required to extract e. g. meaningful user models and user patterns. Therefore, state-of-the-art machine learning systems require high computation power, increased storage capacity, and increased cache capacity at the computing system which hosts the machine learning system. In addition, a significant amount of network transmissions can occur when the machine learning system is hosted e. g. on a single machine, such as a central server being part of a distributed computing environment.

A further aspect is that a single and centrally operated machine learning system constitutes a single point of failure. When no alternative machine learning system is available, in case of failure, the functionality of the distributed computing environment may be severely affected.

In order to reduce the amounts of data to be transmitted as well as the general loss of the machine learning functionality in the case of a failure, decentralized data gathering applied in a distributed machine learning system is taught herein, thereby making use of the data replication capability of a peer-to-peer system.

The present disclosure generally relates to storing and making available cached data in a distributed manner, i.e., at a plurality of network nodes of a peer-to-peer system. Generally, the plurality of network nodes, also referred to as clients hereinafter, store copies, pre-computed, pre-processed or in any way prepared data (i.e., the cached data as introduced above) corresponding to original data. The original data is held at an original data source 3 (which might be a distributed system on its own). Data stored in a peer-to-peer system can be distributed over several clients of the peer-to-peer system in several ways. In one case, each client holds cached data which are disjunct with respect to cached data held by the other clients of the peer-to-peer network. One client in the network does not share the same data with another client. As an example, a number of data records being identifiable and retrievable by a number of associated key-values $X_1, X_2, \ldots, X_N$ may be stored by three clients, referred to as first client, second client and third client. The number of data records forms at least a part of the cached data which corresponds to the original data of the original data source. The first client may store the key-values $X_1, X_2, \ldots, X_n$, the second client stores the key-values $X_{n+1}, \ldots, X_m$ and the third client stores the key-values $X_{m+1}, \ldots, X_N$. Hence, in such storing model, no data record of the cached data is stored at more than one cache client.

In another case, all clients of the network hold the same data, e.g., all the cached data corresponding to the original data. With reference to the aforementioned example, the first, second and third client all store the same data recording identified by the key-values $X_1, X_2, \ldots, X_N$.

It should be noted, that in the aforementioned example, not every client of the first, the second and the third client may hold an up-to-date version of cached data records as the underlying original data may change from time to time at the original data source 3 and, therefore, cached data held by a client may be outdated, whereas the other client may hold an up-to-date version of the cached data record.

In practice, mixed data storage models might be employed where the cached data distributed over the various clients partially overlap. In the aforementioned example of the three clients forming part of a distributed computing environment, the first client may e.g., store the cached data records with the key-values $X_1, X_2, \ldots, X_n$, the second client may store $X_{n-2}, X_{n-1}, X_n, X_{n+1}, \ldots, X_m$, the third client may store the key-values $X_{m-2}, X_{m-1}, X_m, X_{m+1}, \ldots, X_N$.

In addition, cache data stored across various clients may have a level of correlation to each other. The highest level of correlation is identity. For example, the cached data record with the key-value $X_2$ stored at the first client is correlated to the cached data record with the same key-value $X_2$ stored at the second client (irrespective of whether or not both versions of the cached data record $X_2$ are up-to-date, i.e., in line with the original data underlying $X_2$). Hence, if the original data corresponding to the cached data $X_2$ is changed, both cached data records $X_2$ have the identical probability of being outdated by this change. At a lower level of correlation, cached data records may be correlated due to the known principle of locality, e.g., as they (or the underlying original data) are "neighbors" in the database of the original data source 3. For example, given that the cached data record with key-value $X_2$ is closely correlated with neighboring cached data record $X_3$, it is likely that an invalidation of $X_2$ (due to a change of the underlying original data) also renders $X_3$ invalid. Moreover, there may also be cached data records which only have a very low correlation or no correlation at all. For such uncorrelated cached data records, a high probability that a first cached data record is outdated does not have any implication whether or not a second data record which is uncorrelated to the first cached data record is outdated as well.

The present disclosure refers to a distributed machine learning system applied on a peer-to-peer system according to which a plurality of clients does not only hold a number of cached data, but a client also holds a respective probabilistic model modelling the validity likelihood of the cached data stored at the client. The machine learning entity at a client may be adapted to the storage model of the cached data across the clients, i.e., either a disjunct storage model, a "data stored at multiple clients" model, or a particularly overlapping storage model. More specifically, a client of the peer-to-peer network holding a particular fraction of the distributed data may have information on which ones of the other clients of the network hold the same or parts of the particular fraction of the data and/or cached data which is correlated to the own cached data. The machine learning entities at the clients exchange information about adaptions of the local probabilistic model, optionally taking into account the correlation of their cached data.

FIG. 1 illustrates a distributed computing system as utilized herein in a schematic manner comprising at least a first client 1, a second client 2, an original data source 3 and a number of communication interfaces 4. Original data source 3 may, in some embodiments, be composed of several individual original data sources.

Figure 7:
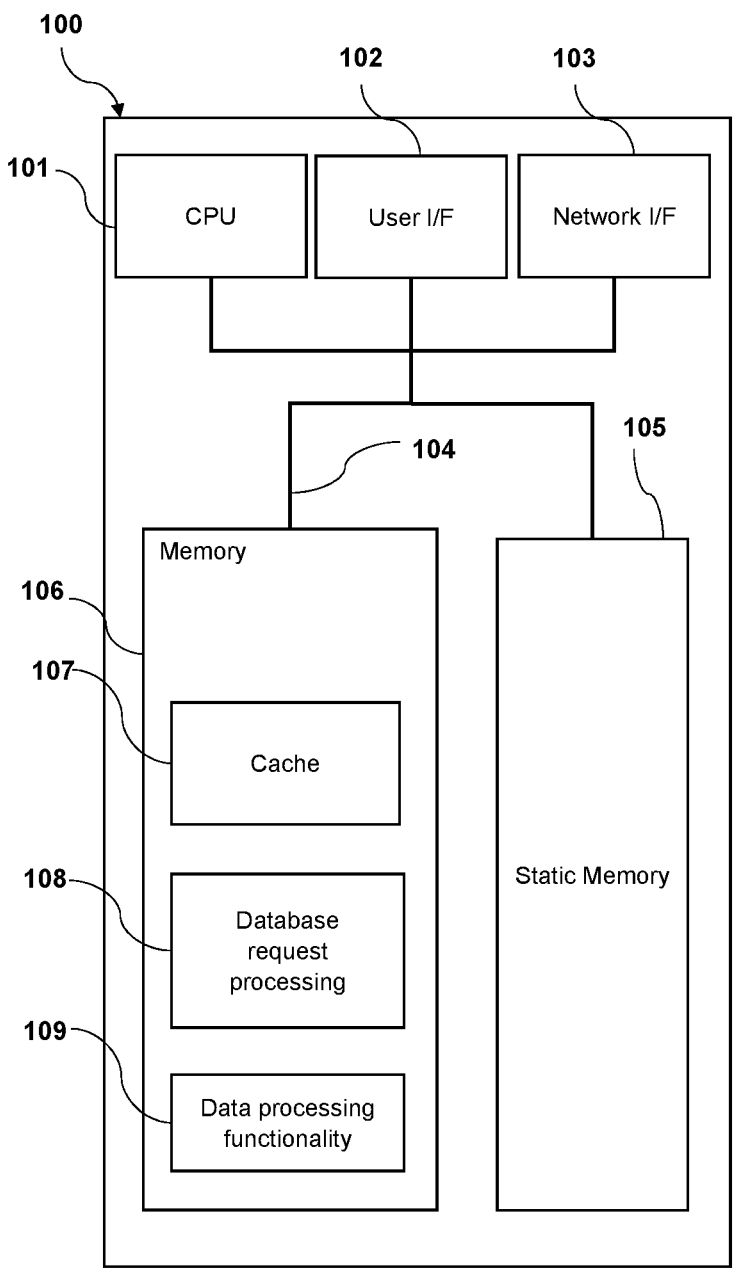
FIG. 7 is a diagrammatic representation of the internal components of a computing machine according to some embodiments.

First client 1, second client 2 and original data source 3 may be constituted of several hardware machines depending on performance requirements. Both, first client 1, second client 2 and original data source 3 are embodied e.g., as stationary or mobile hardware machines comprising computing machines 100 as illustrated in FIG. 7, and/or as specialized systems such as embedded systems arranged for a particular technical purpose, and/or as software components running on a general or specialized computing hardware machine (such as a web server and web clients).

First client 1, second client 2 and original data source 3 are interconnected by the communication interfaces 4. Each of the interfaces 4 utilizes a wireline or wireless Local Area Network (LAN) or a wireline or wireless Metropolitan Area Network (MAN) or a wireline or wireless Wide Area Network (WAN) such as the Internet or a combination of the aforementioned network technologies and are implemented by any suitable communication and network protocols.

Figure 2:
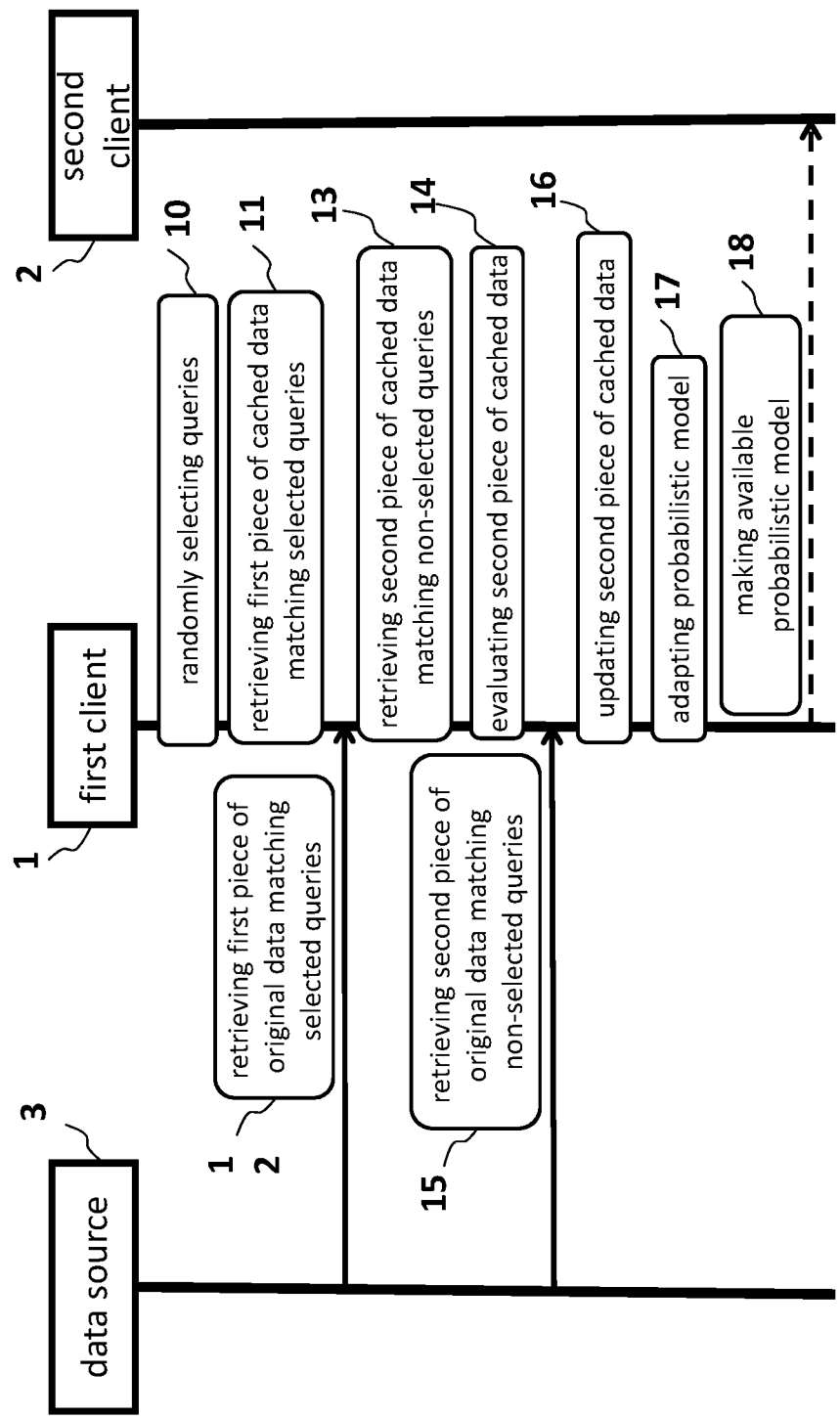
FIG. 2 is a message sequence chart for adapting a probabilistic model for the validity of data cached at a first client.

A message sequence chart for a mechanism according to some embodiments is presented in FIG. 2. A distributed database system comprises at least one original data source 3 which stores an amount of original data. Furthermore, the distributed database system comprises a plurality of clients comprising at least a first client 1 and a second client 2, wherein the first client 1 and the second client 2 store cached data which may overlap as described in the aforementioned cases and which corresponds to at least a part of the amount of original data stored in the data source. The first client 1 and the second client 2 host a probabilistic model yielding validity values associating with the cached data indicating a probability that the cached data stored at the client coincides with the corresponding original data.

According to some embodiments, in an activity 10, the first client 1 randomly selects queries or subsamples of queries from among a plurality of queries handled by the distributed database system, at the time the respective queries are received from one of the plurality of clients. For each of the queries randomly selected, the first client 1 retrieves in an activity 11 a first piece of the cached data stored at the first client and matching the randomly selected query, and retrieves in an activity 12 a first piece of the original data matching the randomly selected query from the at least one original data source. To cite an example, first client 1 may retrieve as first piece of cached data an SQL-processable tables "table_A1_cached" and "table_A2_cached". Furthermore, first client 1 may retrieve as first piece of the original data from the data source 3 the SQL-processable tables "table_A1_original" and "table_A2_original".

First client 1 additionally retrieves in an activity 13 for queries not being randomly selected a second piece of the cached data stored at the first client 1 and matching the query, wherein the query belongs to the queries not being randomly selected. Further citing the example of SQL-processable tables, the second piece of cached data may be table "table_B1_cached". First client 1 evaluates in an activity 14 the validity value of the second piece of the cached table "table_B1_cached".

Figure 6:
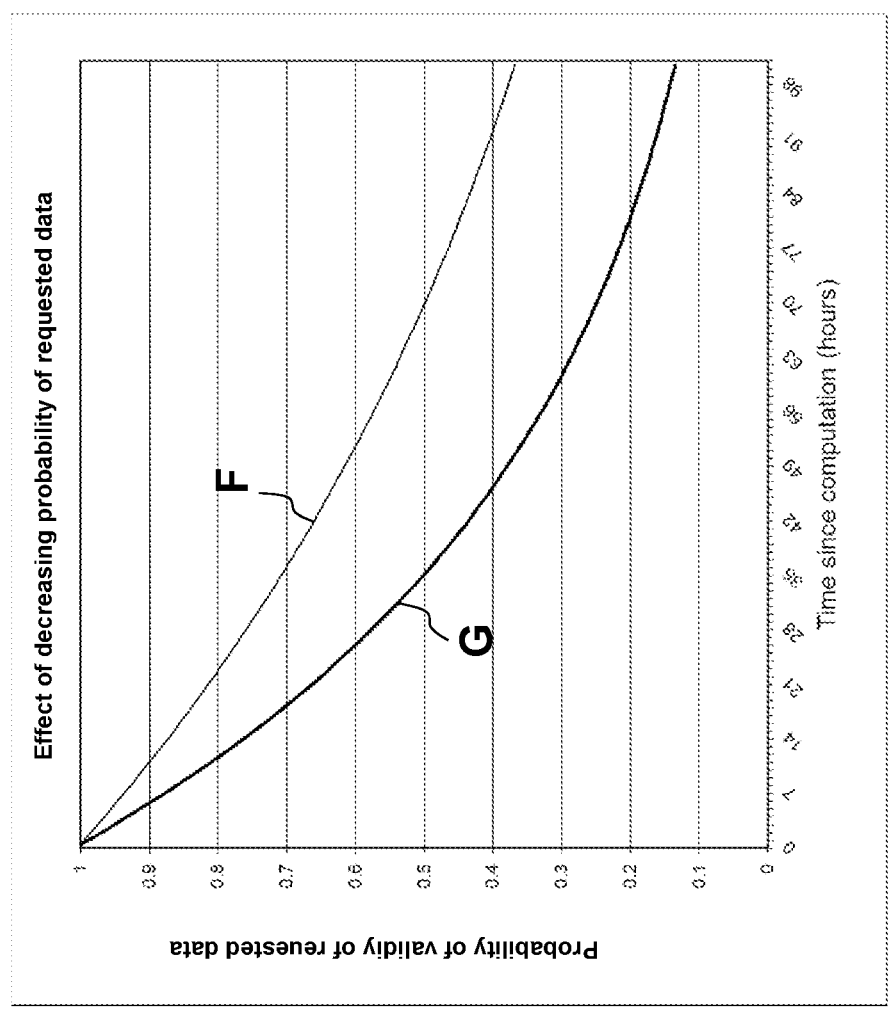
FIG. 6 shows exemplary functions of the probable accuracy decreasing over time according to some embodiments.

In some embodiments, the validity value is given by $$e^{-\lambda(t-t_0)}$$

and is evaluated as validity probability value by first client 1, wherein t denotes a current time or the estimated time of receipt of the data, e. g. table "table_B1 cached". A validity (or invalidity) rate λ may be employed to provide an estimate of the probability for requested data to stay valid after a given time. This is also referred as the probability of requested data (e. g. table "table_B1 cached") being valid or, in other words, not being outdated. Two exemplary functions of this probable accuracy decreasing over time are depicted by FIG. 6. Function F represents requested data which potentially remains more accurate (or, more correctly, stays at a higher probability of being valid over time) than another requested data associated with function G. For example, the requested data represented by function F has 70% probability of being still valid at 35 hours after its last generation, while the other requested data characterized by function G is only valid up to about 50% at 35 hours after its latest generation. First client 1 compares the validity probability value for second piece of cached data, e. g. table "table_B1 cached", with a given threshold value. If the validity probability value is below a given threshold, first client 1 retrieves in an activity 15 a second piece of the original data matching the query from the at least one original data source, wherein the second piece of the original data may be table "table_B1_original". First client 1 updates in an activity 16 the second piece of the cached data stored at the first client by the second piece of the original data, which in the case of the presently described example means the replacement of table "table_B1_cached" with table "table_B1_original".

First client 1 adapts in an activity 17 the probabilistic model of the first client based on the retrieved first piece of the cached data (e. g. table "table_A1_cached") and the retrieved first piece of the original data (e. g. table "table_A1_original") using a machine learning algorithm. In particular, the retrieved cached data and the retrieved original data are compared to determine whether retrieving the original data would have been appropriate or not. That is, if the comparison results in that the retrieved cached data coincides with the retrieved original data, retrieving the original data would have been inexpedient as the cached data was still valid; otherwise, it would have been sensible as the cached data was invalid. This result indicating an efficiency of retrieving the original data from the original data source (also referred to as polling) is stored together with the retrieved cached data and the retrieved original data, and used to adapt the probabilistic model from which the validity rate associated with the cached data is derived.

The adaptation is made by using a machine learning algorithm as described e.g., by U.S. Publication Number 2019/0303480.

Accordingly, the probabilistic model is improved and the decision of whether polling (i.e., retrieving the original data from the database and updating the cached data) is necessary and thus efficient is adapted, thereby increasing the precision of the probability model. This allows to reduce the number of polling by improving the polling decision.

As an example, the validity rate $\alpha$ for the first piece of cached data may be adapted by first client 1. The in-/validity rate $\lambda$ is a measure of how long the piece of cached data (e. g. table "table_A1_cached") remains valid or how fast the cached data becomes invalid due to changes of the underlying original data (e. g. table "table_A1_original"). This validity rate of a given cached data is, for example, statistically derived from the occurrence and the outcomes of past (re-)computations or (re-)collections and comparisons of the requested data with its previous state or values. For example, it has been determined by an earlier adaption of the probabilistic model that particular requested data has an invalidity rate $\lambda$ of 10% per hour meaning that the probability of the cached data being valid decreases by 10% every hour. At the time of its (re-)collection or (re-) computation, table "table_A1_cached" is generally 100% valid. After one hour, table "table_A1_cached" is valid with a probability of 90%. After two hours the validity of table "table_A1_cached" is 81% (=90% decreased by another 10%). After three hours, table "table_A1_cached" probable validity is at 72.9%, and so on.

The adaption of the probabilistic model carried out by first client 1 may result in a new invalidity rate $\lambda$ of 20% per hour for the first piece of cached data, e.g., due to a determination that the first piece of cached data has recently become outdated on a more regular basis. This means that after one hour, table "table_A1_cached" is valid with a probability of 80%. After two hours the validity of table "table_A1_cached" is 64% (=80% decreased by another 20%). After three hours, table "table_A1_cached" probable validity is at 51.2%, and so on.

After adaptation of the probabilistic model, in an activity 18, first client 1 makes the adapted probabilistic model to the second client 2 available. Various technical manners of making available are envisaged. For example, in some embodiments, the first client 1 stores the data specifying the probabilistic model adaption at a given location for retrieval by the second client 2 (pull). Additionally or alternatively, the first client 1 may send the data specifying the probabilistic model adaption to the second client 2 without any retrieval request (push).

In some embodiments, making available the adapted probabilistic model of the first client 1 to the second client 2 takes into account the level of correlation between the cached data of the first client 1 for which the probabilistic model was adapted and the cache data held at the second client 2. Generally, the adaptions to the probabilistic model of the first client 1 which refer to such cached data of the first client 1 which has at least some significant correlation (e.g., correlation meeting at least a given threshold) to cached data stored at the second client 2 is made available. Adaptions to the probabilistic model of the first client 1 which refer to cached data of the first client 1 which has no correlation or no significant correlation (e.g., below the given threshold) may not be made available to the second client 2 because such parts of the probabilistic model of the first client 1 is, at least currently, not useful for the second client 2.

More specifically, if a data storage model is applied according to which all clients hold the same cached data, i.e., the cached data stored by the first client 1 and stored by the second client 2 relate to the same underlying original data which means that the cached data held by the first client 1 and by the second client 2 are fully correlated, the activity of making the adapted model available may be executed by transmitting any updated validity rates $\lambda$ for cached data records of the first client 1 to the second client 2. With continued reference to the example above, the first client 1 may transmit the updated invalidity rate $\lambda$ of 20% per hour to the second client 2 over the communication interface 4 or by sending an indication that an updated invalidity rate for the first piece of cached data is now available at first client 1. At second client 2, the adapted validity rate $\lambda$ can be then be applied to the probabilistic model of the second client 2 for the first piece of cached data stored at the second client 2. Hence, the second client 2 may adapt its own probabilistic model by replacing the current value of the invalidity rate for the first piece of cached data by the updated value of 20%.

The same is applicable to data storage models according to which the cached data held by the first client 1 partially overlaps. Here, the updated value for validity rate $\lambda$ of the first piece of cached data, as adapted by first client 1, is made available to the second client 2 if the second client 2 stores the first piece of cached data as well and/or stores other pieces of cached data which are correlated to the first piece of cached data. Similar considerations apply when validity rates are assigned to subsets of multiple pieces of cached data. For example, first client 1 holds cached data subsets A1, B1 and C1, each including multiple pieces of cached data being correlated to each other. A probabilistic model has been established for each of the cached data subsets with the corresponding validity rates $\lambda A1$ for cached data subset A1, $\lambda_{B1}$ for cached data subset B1 and $\lambda'$ for cached data subset C1. Second client 2 holds data subset A2 which overlaps fully with data subset A1 of first client 1. Furthermore, second client 2 holds data subset D2 which overlaps partially with data subset C1 of first client 1. In addition, second client 2 holds data subset Y2 which does not overlap with any data subset hold by first client 1. Data subset B1 hold by first client 1 has no overlap with any subset of second client 2 either.

First client 1 adapts the probabilistic model for the data subsets A1, B1 and C1, whereby adapted validity rates are obtained, namely $\lambda'_{A1}$ for data subset A1, $\lambda'_{B1}$ for data subset B1 and $\lambda'_{C1}$ for data subset C1. First client 1 and second client 2 may be aware of the different degrees of overlap between various subsets held by themselves and the corresponding different degrees of correlation between the subsets of cached data. To address these different degrees of correlation, in some embodiments, first client 1 or second client 2 may associate weight values with the adapted validity rates. For fully overlapping data (high correlation), as this may be realized between data subset A1 and data subset A2 a weight value '1' may be associated to $\lambda'_{A1}$. For data subsets with no overlap at all (low correlation if pieces of data in the subsets are local to each other, or no correlation), such as for data subset B1 a weight value of '0' may be assigned to $\lambda'B1$. For partially overlapping data subsets (medium or medium-to-high correlation), such as for data subset B1, a weight value between zero and one, such as '0.8' may be assigned to $\lambda'_{C1}$. The weight factor may be higher, the closer the corresponding cached data held at first client 1 are to the second client 2 (closer in terms of the above-mentioned principle of locality).

By utilizing the weight values, first client 1 makes, in some embodiments, in activity 18 those adapted validity rates available, for which a weight value greater than zero has been assigned. In some embodiments, first client 1 makes available adapted validity rates associated with the weight values, so that the second client 2 is able to adapt its own probability model based on the adapted validity rates of the first client 1 and the associated weight values. In the specific example above, first client 1 makes available only validity values $\lambda'_{A1}$ and $\lambda'_{C1}$, optionally tuples $\lambda'_{A1}$:1 and $\lambda'_{C1}$:0.8. In some embodiments, first client 1 sends the adapted model parameters $\lambda'_{A1}$ and $\lambda'_{C1}$ possibly accompanied with the associated weight values to second client 2 in a message comprising an indication to which subsets of cached data these model parameters belong. In some embodiments, first client 1 sends an indication to second client 2 that the adapted model parameters $\lambda'_{A1}$ and $\lambda'_{C1}$ are now available at first client 1.

In some embodiments, in a process of decentralized parameter gathering, a variety of validity rates may be calculated by different clients according to the method described above and shown in FIG. 2, wherein each individual validity rate $\lambda i$ may refer to cache data (e.g., individual sets of cached data, shares of correlated cached data) of different nature and fields, such as image processing, traffic flows etc. At a central entity acting as a parameter server such as a specific client or a massive computation unit, these validity rates $\lambda i$ may be collected and further processed, e.g., to assess the learning process of individual clients, to monitor failure-free operation of clients, etc.

The exchange of model parameters as e. g. validity rates $\lambda$ in a distributed machine-learning (e.g., peer-to-peer) relieves a central entity traditionally maintaining the probabilistic model to track invalidity probabilities of cached data from network and computation load, and thus eliminates a technical bottleneck issue in such system. Since the machine learning capability carried out by first client 1 can be re-used by another client, the possibility of constantly adapting the probabilistic model is given, therefore rendering the machine learning process more effective and increasing overall resiliency of the whole network.

Figure 3:
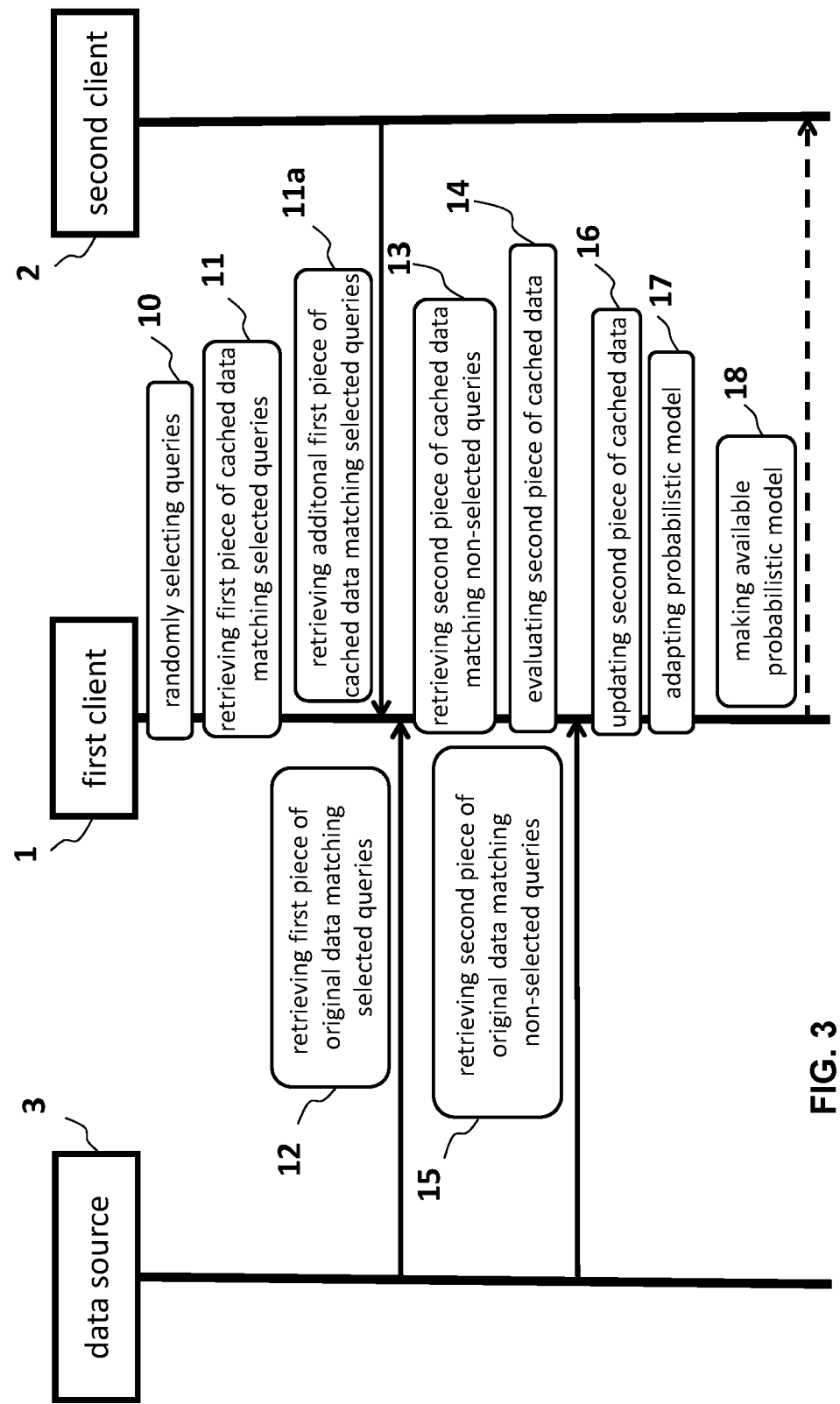
FIG. 3 is a message sequence chart according to FIG. 2 and an additional retrieval of data cached at a second client.

In some embodiments shown in FIG. 3, first client 1 retrieves for queries randomly selected an additional first piece of local cached data stored by at least one other client of the plurality of clients and matching the randomly selected query (activity 11*a*). Alternatively or additionally, first client 1 may acquire in an activity 11*a* additional data cached at a further data source. On the one hand, these additional pieces of cached data may be used to prepare and return the response to the query to the requesting client. On the other hand, these additional pieces of cached data can be utilized to more universally adapt the probabilistic model of the first client 1 and, thus, to accelerate the machine learning process at the first client 1.

To this end, the first client 1 may also retrieve, for each additional piece of cached data, an additional piece of the original data matching the randomly selected query from the at least one original data source. As the one or more additional piece of data match the search criteria of the query, at least a certain level of correlation can be assumed between the first piece of data and the one or more additional pieces of data. Hence, a determination of the validity of the one or more additional pieces of data (e.g., by comparison of the additional cached pieces of data with the corresponding original pieces of data as described above for the first piece of data) may be used to adapt the probabilistic model of the first client more effectively, using a broader basis of learning data. Weight values indicating a level of correlation between additional pieces of cached data and the first piece of cached data as well as current validity values of the additional pieces of cached data (e.g., given by the formula as mentioned above) may be retrieved from the other client or other data source and be utilized to adapt the probabilistic model of the first client. Optionally, the first client 1 may include the retrieved one or more additional pieces of cached data (possibly updated by the retrieved pieces of original data) in the cached data stored at the first client 1.

As an example, client 1 may retrieve the table "table_a2_cached" from second client 2 and use it together with the table "table_a1_cached" for the adaptation of the probabilistic model. Since in a distributed machine learning environment deployed in a peer-to-peer network every client can simultaneously carry out the functions of first client 1, the network traffic that occurs when e. g. the tables are transmitted to the clients acting as first clients is no more directed to just one node, but directed to more sources. Therefore, the network traffic may be more evenly distributed over the distributed computing environment.

Figure 4:
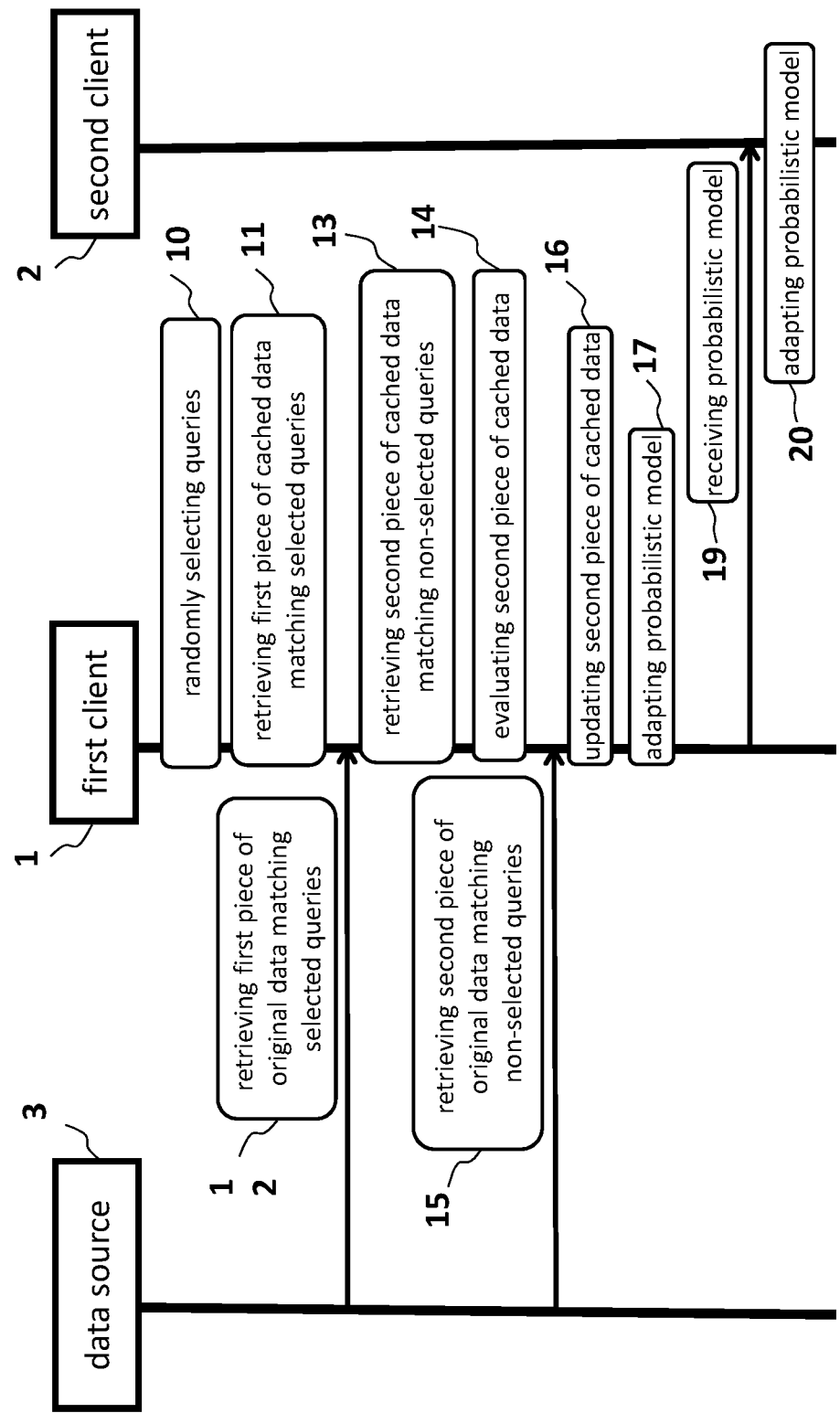
FIG. 4 is a message sequence chart according to FIG. 2 including adapting a probabilistic model of a second client based on a received update of the probabilistic model of the first client.

Now referring to FIG. 4, in some embodiments, after adaptation of the probabilistic model by first client 1, second client 2 retrieves in an activity 19 at least a part of the adapted probabilistic model from the first client 1 and further adapts in an activity 20 its own probabilistic model based on the retrieved adapted probabilistic model of the first client 1. Again, taking the aforementioned example of the partially overlapping data subsets C1 and D2, which are held by first client 1 and second client 2 respectively, second client 2 receives the validity rate $\lambda'_{C1}$ already adapted by first client 1 based on data subset C1, e. g. on the table "table_A1_cached" and calculates a further, adapted validity rate $\lambda'_{D2}$ which may be based on data subset D2, e. g. the table "table_A2 cached".

As mentioned above, in some embodiments, the second client 2 receives an updated validity rate for the first cached data associated with a weight value. The weight value indicates a level of correlation of the first piece of cached data stored at the first client 1 with another piece of cached data stored at the second client 2. In such embodiments, adapting the probabilistic model of the second client 2 based on the retrieved adapted probabilistic model of the first client 1 comprises adapting the probabilistic model of the second client 2 based on the updated validity value for the first cached data associated and the associated weight value. More specifically, the second client may apply the updated validity rate received from the first client 1 on a validity rate of its own probabilistic model indicating a validity probability of the other piece of cached data of the second client 2, the other piece of cached data of the second client 2 being correlated to the first piece of cached data of the first client 1 to a degree as indicated by the associated weight value.

If the weight value indicates a full correlation (e.g., weight value 1), the second client may include the updated validity rate received from the first client 1 into its own probabilistic model, namely the validity rate of the other cache data of the second client 2, without discount, i.e., in a similar manner as native updates obtained by analogous execution of the mechanism of FIG. 2 at the second client 2. For example, in case of a full correlation, the second client 2 may replace the current validity rate of the other cached data by the updated validity rate received from the first client 1. The second client 2 may also update the validity rate of the other cached data by including the received updated validity rate of the first piece of cached data of the first client 1 in other manners, for example by way of exponential smoothing.

If the weight value indicates a lower degree of correlation (e.g., weight value 0.8 indicating a correlation of 80%), the second client 2 may integrate the updated validity rate received from the first client 1 in a discounted manner. For example, the second client may calculate an updated weighted average by using or adding the updated validity rate received from the first client to the series of validity rates of an exponential smoothing in a discounted manner, e.g., by multiplying the updated validity rate received from the first client 0.8 with the associated weight value.

In addition, the second client 2 may also adapt validity rates of further pieces of cached data stored at the second client 2 which are correlated to the other piece of cached data to which the received weight value refers. In this regard, the second client 2 may derive further weight values depending on the level of correlation between the other piece of cached data and the further pieces of cached data. For example, a further piece of cached data may be correlated with the other piece of cached data to a degree of 90%, resulting in a weight value of 0.8×0.9=0.72. Hence, the updated validity rate received from the first client 1 can be applied to update the validity rate of this further piece of cached data of the second client by using a weight value of 0.72, reflecting the correlation between the first piece of cached data of the first client 1 and the other piece of cached data of the second client 2 on the one hand and the other piece of cached data and the further piece of cached data of the second client 2 on the other hand.

Figure 5:
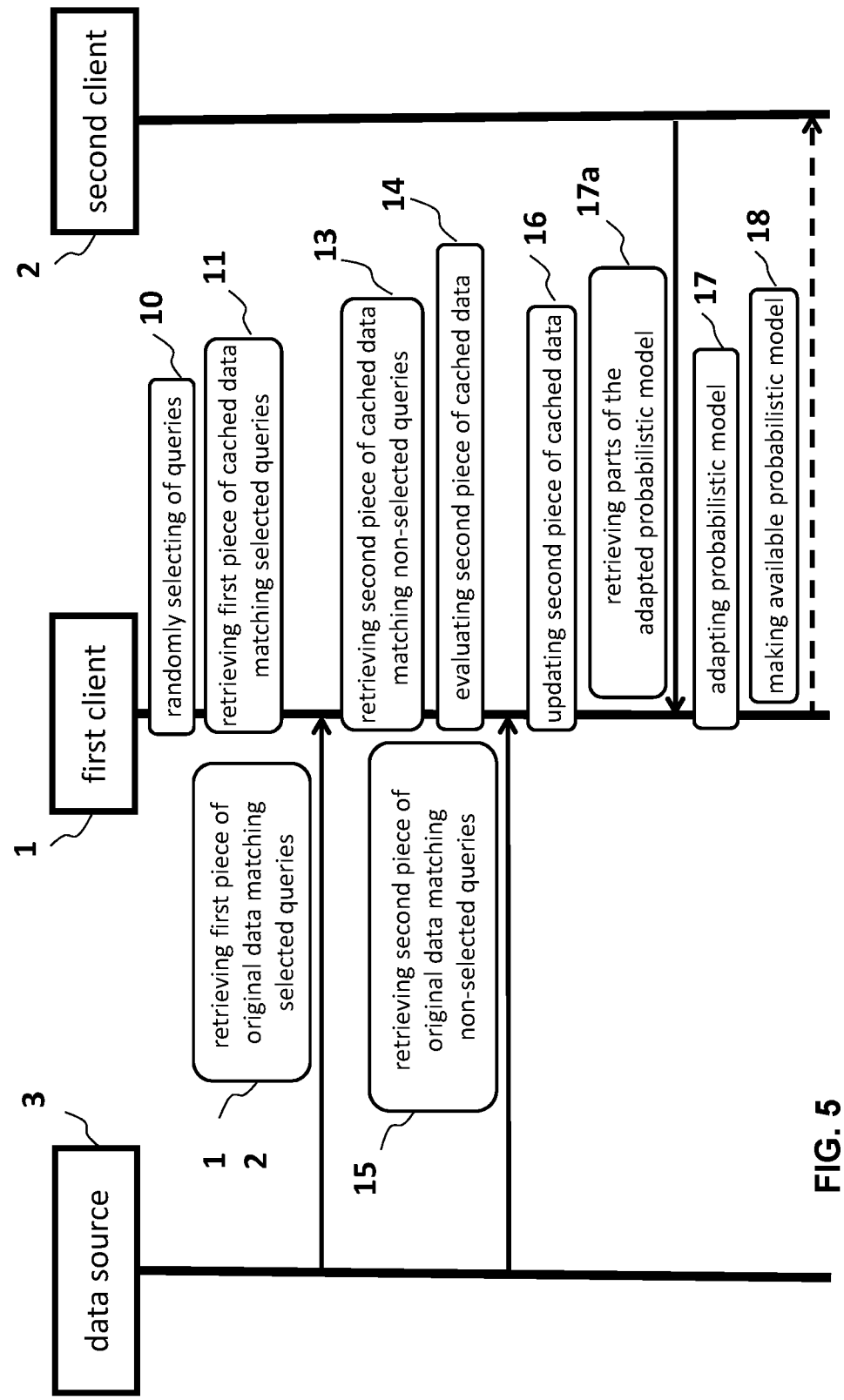
FIG. 5 is a message sequence chart for adapting the probabilistic model of the first client using parts of the probabilistic model adapted by the second client.

With reference to FIG. 5, in some embodiments, before adaptation of its own probabilistic model, first client 1 retrieves in an activity 17a from second client 2 at least a part of the adapted probabilistic model of the second client 2. Taking again the aforementioned example of the partially overlapping data subsets C1 and D2, first client 1 may retrieve a validity rate $\lambda''_{D2}$ from second client 2 whereby $\lambda''_{D2}$ may have been adapted on table "table_A2 cached" and subsequently adapts in activity 17 its own probabilistic model based on the retrieved adapted probabilistic model ($\lambda''_{D2}$) of the second client 2 and in addition on data subset C1, e. g. table "table_A1_cached". First client 1 would therefore obtain an adapted validity rate $\lambda''_{C1}$. In activity 20, first client 1 makes its adapted probabilistic model, such as adapted validity rate $\lambda''_{C1}$, available to still other clients.

In the subject disclosure, any machine learning algorithm which can be used in connection with probabilistic models may be established. For example, the machine learning algorithm, given a plurality of selected search queries converted into a set of structured features, builds a probabilistic model to predict a target (e.g., first indicator value stored with the search queries). The term "feature" here concerns any information that can be deduced from the search queries. The conversion of the plurality of selected search queries may comprise computing values of all features, using the search criteria and/or reference data (e.g., tables showing default output values for the given electronic circuit, etc.). For example, from all search criteria of the plurality of search queries and the reference data, the set of features to be used by the machine-learning algorithm may be selected. The set of features may therefore contain a mixture of search criteria and features requiring computations, but a feature may also correspond to one or more search criteria (e.g., all input parameters for a given electronic circuit to be simulated by the computer-based electronic circuit simulations, timestamp of the search query, etc.). The set of features are structured as the machine-learning algorithm requires input of e.g., a structured data file (e.g., comma separated data file), with one row by search query and one column by feature. The order of the columns follows a given pattern in order for the probabilistic model to be correctly used once deployed. The machine learning algorithm may also iteratively build a decision tree. Starting from the plurality of the selected search queries, the machine learning algorithm tests features and conditions on these features to split the plurality in two child sets. One of these tests may be "is the input parameters for the given electronic circuit equal to a voltage having a value of 10" (i.e., in general, check whether the feature equals a given value), or "is the input parameter for the given electronic circuit equal to a voltage having a value greater than 20" (i.e., in general, check whether the feature is greater/smaller than the given value). From all the features and conditions tested, the machine learning algorithm keeps only the feature and condition which separates the most the plurality into a first child set containing search queries with their target equal to one value, and a second child set containing the search queries with their target not equal to the one value. In other words, the decision tree is built by the machine learning algorithm such that a feature is taken as a node with two outgoing paths, one for search queries having the feature which equals the given value (the first child set) and another path for search queries having the feature which does not equal the given value (the second child set). That is, the search queries are divided into two child sets based on the feature. The machine learning algorithm progressively builds the decision tree, by then also splitting the child sets in smaller sets with the same feature and condition selection logic. The machine learning algorithm stops once the decision tree reaches a given size or complexity provided in parameter thereof.

FIG. 7 is a diagrammatic representation of the internal component of a computing machine of first client 1, second client 2 and/or original data source 3. The computing machine 100 includes a set of instructions to cause the computing machine 100 to perform any of the methodologies discussed herein when executed by the computing machine 100. The computing machine 100 includes at least one processor 101, a main memory 106 and a network interface device 103 which communicate with each other via a bus 104. Optionally, the computing machine 100 may further include a static memory 105 and a disk-drive unit. A video display, an alpha-numeric input device and a cursor control device may be provided as examples of user interface 102. The network interface device 103 connects the computing machine 100 to the other components of the distributed computing system such as first client 1, second client 2, original data source 3 or further components.

Computing machine 100 also hosts the cache 107. The cache 107 may store the received database tables also in a cache. The cache 107 within the present embodiments may be composed of hardware and software components that store the database tables so that future requests for the database tables can be served faster than without caching. There can be hardware-based caches such as CPU caches, GPU caches, digital signal processors and translation lookaside buffers, as well as software-based caches such as page caches, web caches (Hypertext Transfer Protocol, HTTP, caches) etc.

A set of computer-executable instructions (i.e., computer program code) embodying any one, or all, of the methodologies described herein, resides completely, or at least partially, in or on a machine-readable medium, e.g., the main memory 106. Main memory 106 hosts computer program code for functional entities such as database request processing 108 which includes the functionality to receive and process database requests and data processing functionality 109. The instructions may further be transmitted or received as a propagated signal via the Internet through the network interface device 103 or via the user interface 102. Communication within computing machine is performed via bus 104. Basic operation of the computing machine 100 is controlled by an operating system which is also located in the main memory 106, the at least one processor 101 and/or the static memory 105.

In general, the routines executed to implement the embodiments, whether implemented as part of an operating system or a specific application, component, program, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages

What is claimed is:

1. A method of processing queries in a distributed database system, the distributed database system comprising an original data source storing an amount of original data and a plurality of clients that include a first client and a second client, the first client and the second client storing cached data which corresponds to at least a part of the amount of original data, the first client and the second client hosting a probabilistic model yielding validity values associating with the cached data indicating a probability that the cached data stored at the client coincides with the corresponding original data, the method comprising:
at the first client:
randomly selecting queries from among a plurality of queries handled by the distributed database system;
at the time the respective query is received from one of the plurality of clients;
for each of the queries randomly selected,
retrieving a first piece of the cached data stored at the first client and matching the randomly selected query, and
retrieving a first piece of the original data matching the randomly selected query from the at least one original data source;
for queries not being randomly selected,
retrieving a second piece of the cached data stored at the first client and matching the query;
evaluating the validity value of the second piece of the cached data stored at the first client;
if the validity value is below a given threshold,
retrieving a second piece of the original data matching the query from the at least one original data source, and
updating the second piece of the cached data stored at the first client by the second piece of the original data; and
adapting the probabilistic model of the first client based on the retrieved first piece of the cached data and the retrieved first piece of the original data using a machine learning algorithm; and
making available the adapted probabilistic model to the second client.

2. The method of claim 1 further comprising:
for queries randomly selected, retrieving an additional first piece of cached data stored by at least one client of the plurality of clients and matching the randomly selected query.

3. The method of claim 2 wherein the probabilistic model is further adapted based on the additional first piece of cached data.

4. The method of claim 1 further comprising:
at the second client:
receiving at least a part of the adapted probabilistic model of the first client from the first client; and
adapting the probabilistic model of the second client based on the retrieved adapted probabilistic model of the first client.

5. The method of claim 4 wherein making available the adapted probabilistic model to the second client comprises:
making available an updated validity value for the first cached data associated with a weight value to the second client,
wherein the weight value indicates a level of correlation of the first piece of cached data stored at the first client with another piece of cached data stored at the second client.

6. The method of claim 5 wherein adapting the probabilistic model of the second client based on the retrieved adapted probabilistic model of the first client comprises:
adapting the probabilistic model of the second client based on the updated validity value for the first cached data associated and the associated weight value.

7. The method of claim 1 further comprising:
at the first client:
retrieving at least a part of the adapted probabilistic model of the second client from the second client,
wherein the probabilistic model of the first client is adapted further based on the retrieved adapted probabilistic model of the second client.

8. An apparatus for processing queries in a distributed database system, the distributed database system comprising an original data source storing an amount of original data and a plurality of clients, the plurality of clients including the apparatus as a first client, the plurality of clients further including a second client, the first client and the second client storing cached data which corresponds to at least a part of the amount of original data, the first client and the second client hosting a probabilistic model yielding validity values associating with the cached data indicating a probability that the cached data stored at the client coincides with the corresponding original data, the apparatus comprising:
a computing device; and
a computer-readable storage medium comprising a first set of instructions that upon execution by the computing device cause the apparatus to:
randomly select queries from among a plurality of queries handled by the distributed database system;
at the time the respective query is received from one of the plurality of clients;
for each of the queries randomly selected,
retrieve a first piece of the cached data stored at the first client and matching the randomly selected query, and retrieve a first piece of the original data matching the randomly selected query from the at least one original data source;

for queries not being randomly selected,
retrieve a second piece of the cached data stored at the first client and matching the query;
evaluate the validity value of the second piece of the cached data stored at the first client;

if the validity value is below a given threshold,
retrieve a second piece of the original data matching the query from the at least one original data source, and
update the second piece of the cached data stored at the first client by the second piece of the original data; and adapt the probabilistic model of the first client based on the retrieved first piece of the cached data and the retrieved first piece of the original data using a machine learning algorithm; and make available the adapted probabilistic model to the second client.

9. The apparatus of claim 8 wherein the computer-readable storage medium comprises a second set of instructions that upon execution by the computing device cause the apparatus to:
for queries randomly selected, retrieve an additional first piece of cached data stored by at least one client of the plurality of clients and matching the randomly selected query.

10. The apparatus of claim 9 wherein the probabilistic model is further adapted based on the additional first piece of cached data.

11. The apparatus of claim 8 wherein the computer-readable storage medium comprises a second set of instructions that upon execution by the computing device cause the apparatus to:
retrieving at least a part of the adapted probabilistic model of the second client from the second client,
wherein the probabilistic model of the first client is adapted further based on the retrieved adapted probabilistic model of the second client.

12. A non-transitory computer-readable storage medium comprising computer-readable instructions for processing queries in a distributed database system, the distributed database system comprising an original data source storing an amount of original data and a plurality of clients, the plurality of clients including the apparatus as a first client, the plurality of clients further including a second client, the first client and the second client storing cached data which corresponds to at least a part of the amount of original data, the first client and the second client hosting a probabilistic model yielding validity values associating with the cached data indicating a probability that the cached data stored at the client coincides with the corresponding original data, the instructions upon execution by a processor of a computing device cause the computing device to:
randomly select queries from among a plurality of queries handled by the distributed database system;
at the time the respective query is received from one of the plurality of clients;

for each of the queries randomly selected,
retrieve a first piece of the cached data stored at the first client and matching the randomly selected query, and
retrieve a first piece of the original data matching the randomly selected query from the at least one original data source;

for queries not being randomly selected,
retrieve a second piece of the cached data stored at the first client and matching the query;
evaluate the validity value of the second piece of the cached data stored at the first client;

if the validity value is below a given threshold,
retrieve a second piece of the original data matching the query from the at least one original data source, and
update the second piece of the cached data stored at the first client by the second piece of the original data; and adapt the probabilistic model of the first client based on the retrieved first piece of the cached data and the retrieved first piece of the original data using a machine learning algorithm; and make available the adapted probabilistic model to the second client.

* * * * *